US008616950B2

(12) United States Patent
Robichaud

(10) Patent No.: US 8,616,950 B2
(45) Date of Patent: Dec. 31, 2013

(54) BONUS GAME HAVING BONUS POTS FOR CARD HANDS OBTAINED BY PLAYER

(75) Inventor: Samuel N. Robichaud, Dieppe (CA)

(73) Assignee: Spielo International Canada ULC, Moncton, New Brunswick (CA)

( * ) Notice: Subject to any disclaimer, the term of this patent is extended or adjusted under 35 U.S.C. 154(b) by 116 days.

(21) Appl. No.: 13/243,979

(22) Filed: Sep. 23, 2011

(65) Prior Publication Data

US 2012/0015704 A1 Jan. 19, 2012

Related U.S. Application Data

(63) Continuation-in-part of application No. 12/340,398, filed on Dec. 19, 2008, now Pat. No. 8,030,078.

(51) Int. Cl.
*A63F 9/24* (2006.01)
*A63F 13/00* (2006.01)

(52) U.S. Cl.
USPC ............................................ 463/13; 463/20

(58) Field of Classification Search
USPC ................................................... 463/13, 20
See application file for complete search history.

(56) References Cited

U.S. PATENT DOCUMENTS

| | | | |
|---|---|---|---|
| 2005/0159199 A1 | 7/2005 | Moody | |
| 2006/0131809 A1 | 6/2006 | Lancaster et al. | |
| 2008/0108410 A1 * | 5/2008 | Baerlocher | 463/20 |

* cited by examiner

*Primary Examiner* — William M. Brewster
(74) *Attorney, Agent, or Firm* — Patent Law Group LLP; Brian D. Ogonowsky

(57) ABSTRACT

In a gaming machine having virtual reels, conventional instant wins are awarded as well as virtual playing cards. In one embodiment, the cards are dealt only if a special symbol is displayed on the stopped reels. In another embodiment, cards are dealt only during a bonus round. Dealt playing cards are accumulated until the player has a full hand of cards. A different bonus pot is accumulated for various types of poker hands achievable. The pots may be progressively increased based on a percentage of wagers made in a network of gaming machines. After the player is dealt the full set of cards, the best poker hand is determined, and the associated pot is awarded to the player. The pot is then set at a starting value. The bonus game is then terminated. The player is motivated to continue playing to complete a hand and win a large pot.

15 Claims, 5 Drawing Sheets

| | |
|---|---|
| Royal Flush | 50x |
| Five of a kind | 25x |
| Straight flush | 15x |
| Four of a kind | 10x |
| Full house | 8x |
| Flush | 6x |
| Straight | 5x |
| Three of a kind | 4x |
| Two pair | 3x |
| Pair | 2x |
14
Fig. 4
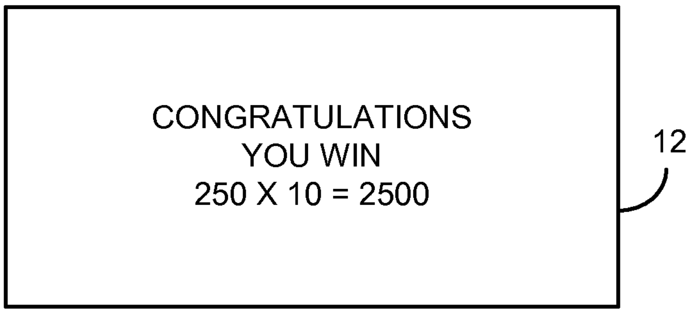
Fig. 5
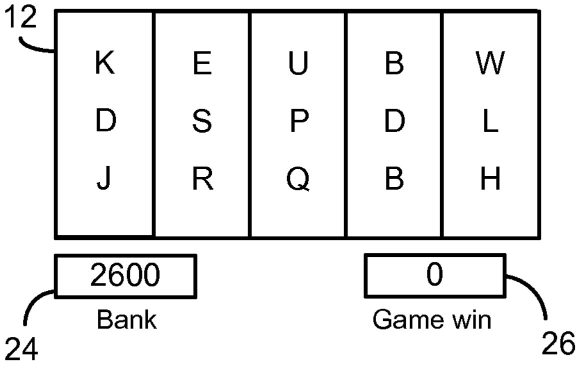
Fig. 6

BONUS GAME HAVING BONUS POTS FOR CARD HANDS OBTAINED BY PLAYER

CROSS-REFERENCE TO RELATED APPLICATIONS

This is a continuation-in-part of U.S. application Ser. No. 12/340,398, entitled, Bonus Game Where Player Collects Playing Cards To Make Hand, filed on Dec. 19, 2008, published as US 2010/0160028A1, assigned to the present assignee, and incorporated herein by reference.

FIELD OF THE INVENTION

This invention relates to gaming devices, such as video slot machines, and, in particular, to a bonus game played on a video slot machine.

BACKGROUND

Common video slot machines randomly select and display an array of symbols, using virtual reels, then grant an award to a player based on the occurrence of certain symbol combinations across paylines. Typically, the game ends after the symbols are displayed and the award, if any, is granted. Although these types of games are highly successful, it is advantageous to provide bonus games that occur once in a while to make the game more interesting to a player. The bonus games typically offer the potential for a high payout. A more interesting game will generate increased revenue to the casino by its increased play.

It is desirable to provide a bonus game that has the potential to award the player a large sum of money to attract the players to the machines; however, such large sums should only be awarded very infrequently. During a typical playing session, the player should experience the bonus game multiple times to maintain player interest in the machine. It is therefore desirable to provide a bonus game that can be triggered relatively frequently to maintain player interest, yet provide only a very small chance of awarding the large sums. Such a bonus game should create a high level of excitement and anticipation in the player.

SUMMARY

The invention may be implemented by a conventional-platform video slot machine that is suitably programmed. The invention can also be implemented by a home computer playing a slot machine type game.

A base game played on the gaming machine may be a conventional video reel-type game that displays a randomly selected array of symbols, where combinations of symbols across one or more paylines are evaluated by circuitry to determine an award to be granted. The array may be formed by five reels, where three symbols on each reel are displayed when the reels stop (a 5×3 array). In one embodiment, there are horizontal and zig-zag paylines, and consecutive winning symbol combinations starting from the leftmost reel are needed to win and award. The player may bet above a minimum bet per game, where either the awards are directly multiplied by the amount bet or additional paylines are activated.

During play of the base game, the virtual reel strips contain special bonus symbols. Displaying at least three of the bonus symbols across a payline initiates a series of free bonus games. The trigger for the free bonus games is designed to occur several times during an average playing session to keep the player interested. In another embodiment, the free bonus games may be initiated by another type of random event, generally called a mystery trigger.

Once the bonus round is initiated, the machine's game processor controls the center reel strip to include a special symbol representing a deck of playing cards. This may be done by changing a low value symbol (e.g., symbol that cannot be used in a winning combination) into a deck symbol or simply adding the deck symbol to the existing set of symbols around the reel. The deck symbol may be added to other reels as well to increase the chances of displaying it.

During the free games round, the player presses a spin button to spin and randomly stop the five reels. Any awards for winning combinations of symbols, using the same payout table for the base game, are accumulated in a "bonus wins" display box. If a deck symbol appears anywhere in the display, a playing card will be randomly dealt to the player and displayed above the reels.

The player keeps playing the free bonus games and accumulating bonus wins and cards until seven cards are dealt. In another embodiment only five cards are dealt. Therefore, the player can play many free games before seven cards are dealt and accumulate a large bonus win. The player does not want the deck symbol to appear in order to play more free games.

Once seven cards are dealt, the best 5-card poker hand is determined by a look-up table, and hands above a pair are associated with a multiplier. In one embodiment, a pair corresponds to a 2× multiplier and a royal flush corresponds to a 50× multiplier. Hand ranks in-between correspond to multipliers ranging from 3× to 25×.

The accumulated amount in the "bonus wins" display box is then multiplied by the multiplier associated with the poker hand, and that amount is awarded to the player such as by incrementing the player's "bank" credits (a conventional credit meter). The player can cash out and receive all credits displayed in the bank credits display box. Therefore, the player is excited by playing the free games and additionally excited by the possibility of achieving a high hand. The excitement of the bonus games builds until the seven cards are dealt.

In one embodiment, the maximum bonus award achievable in the bonus game is limited, and any win above the upper limit is truncated to the limit. In another embodiment, the bonus game starts with the player receiving two randomly dealt cards to reduce the bonus game time.

Instead of a traditional 52-card deck, additional cards may be in the deck, such as wild cards, or cards that grant instant awards, or cards that instantly multiply the current game award, or other special cards. In any event, the player would still receive seven cards that can be used to create a 5-card poker hand.

If, during a bonus round, the player obtains another combination of special bonus symbols to trigger another free game bonus round, the player plays the additional bonus round after the present bonus round is completed.

Other variations are described herein.

In one variation, in each free game that includes the deck symbol, a complete hand of cards is randomly dealt, such as five or seven cards. The 5-card poker hand for that current game is then associated with a multiplier for any win in the current game.

In another variation, a playing card is dealt upon other than receiving a deck symbol. Such a card-dealing trigger may include a certain symbol combination or other random event.

In another variation, a poker hand above a certain rank, such as a full house, awards a bonus pot, such as a progressive jackpot, in addition to acting as a multiplier for credits achieved in the free games.

In another variation a different bonus pot is accumulated for various types of poker hands achievable. When the player receives a certain number of cards, such as seven, the best five-card hand is made, the accumulated bonus pot for that hand is awarded to the player, and the bonus pot begins to accumulate again from a starting value. The pots may be accumulated based on different percentages of each wager made to generally create higher pots for hands that are more difficult to achieve.

Combinations of the various games described are also envisioned.

BRIEF DESCRIPTION OF THE DRAWINGS

FIG. 4 illustrates a portion of a video screen displaying the multiplier associated with each type of winning poker hand.

FIG. 5 illustrates a portion of a video screen displaying to the player the amount won at the end of the bonus round.

FIG. 6 illustrates the video screen of FIGS. 3A-3F after the bonus round ends and the player resumes playing the base game, where the amount won in the bonus round is transferred to the "bank" credit meter.

DETAILED DESCRIPTION

Although the invention can typically be implemented by installing a software program in most types of modern video gaming machines, one particular gaming machine platform will be described in detail.

Figure 1:
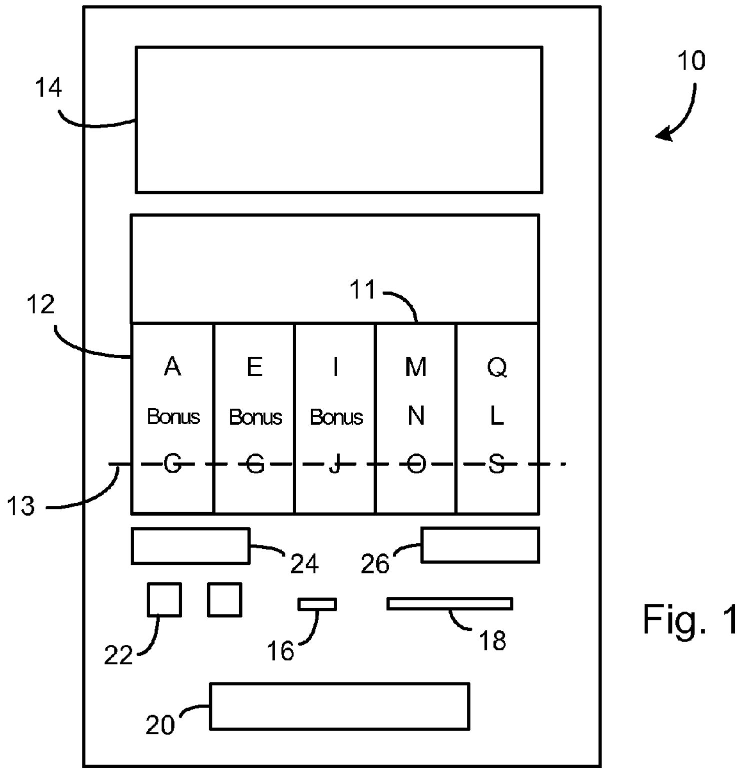
FIG. 1 illustrates a gaming machine that displays a base game and the bonus game in accordance with one embodiment of the present invention.

FIG. 1 illustrates a video gaming machine 10 that incorporates the present invention. The machine 10 includes a bottom display 12 that may be a thin film transistor (TFT) display, a liquid crystal display (LCD), a cathode ray tube (CRT), or any other type of display. In FIG. 1, the base game shown in display 12 is the conventional random selection of a 5×3 array of symbols, displayed on five virtual reels 11, where an award is granted based on symbol combinations across activated paylines, such as payline 13. In one embodiment, bets above the minimum bet activate additional paylines, including horizontal and zig-zag paylines. In another embodiment, all paylines are activated with a single bet, and the awards are multiplied proportional to the amount bet. In one embodiment, there is a maximum of 15 paylines. The base game can be any game, such as a 5×4 array of symbols or any other size or shape array.

A top display 14 is also a video screen, which may be identical to the display 12, that may be used to display aspects of the bonus game, described below.

A coin slot 16 accepts coins or tokens in one or more denominations to generate credits within the machine 10 for playing games. An input slot 18 accepts various denominations of banknotes or machine-readable tickets, and may output printed tickets for use in cashless gaming. A coin tray 20 receives coins or tokens from a hopper upon a win or upon the player cashing out. Player control buttons 22 include any buttons needed for the play of the games offered by the machine 10 including, for example, a bet button, a max-bet button, a spin reels button, a cash-out button, and any other suitable button. Pressing the bet button multiple times multiplies the bet. Buttons 22 may be replaced by a touch screen with virtual buttons.

Each bet deducts credits from a bank meter 24 that stores the accumulated credits from wins and the insertion of money. If the player cashes out, all the credits in the bank meter 24 are paid to the player. A game win meter 26 identifies the amount won for the present game.

Above the 5×3 virtual reels 11 is an area to display cards accumulated during the bonus game, to be described with respect to FIGS. 3A-3F.

Figure 2:
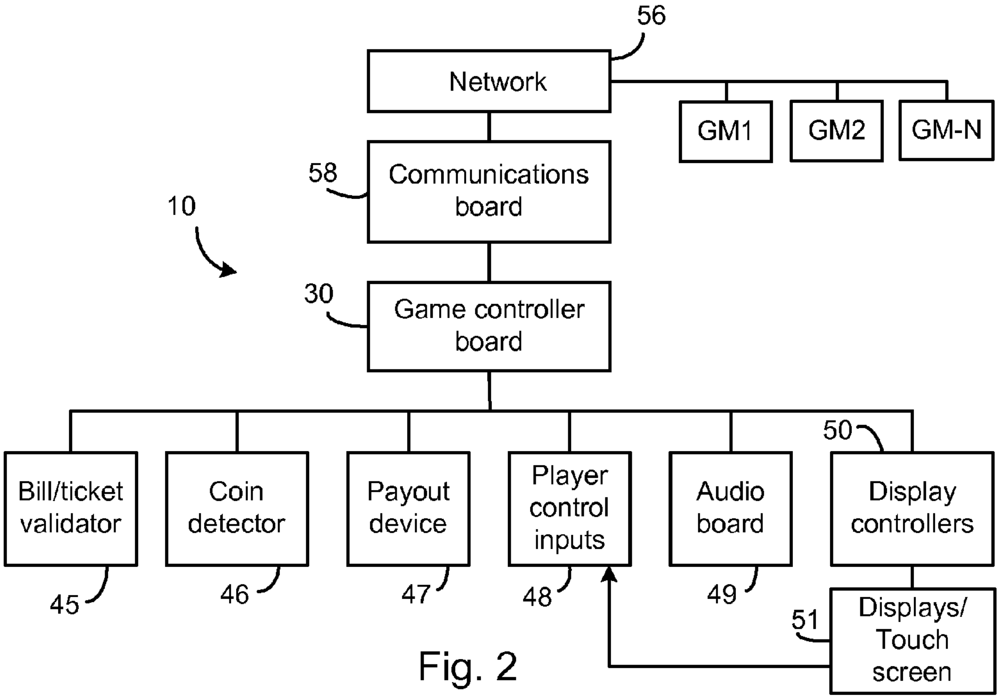
FIG. 2 is a block diagram of key components in the gaming machine of FIG. 1.

FIG. 2 illustrates basic circuit blocks in the machine 10 of FIG. 1 and portions of a network. A game controller board 30 includes a processor (CPU) that runs the gaming program (including any or all aspects of the bonus game) stored in a program ROM, such as a CD. The program ROM may include a pseudo-random number generator program for selecting symbols and for making any other random selections. At least the active portion of the program is stored in a RAM on the board 30 for access by the processor. A pay table ROM on the board 30 detects the outcome of the base game and identifies awards to be paid to the player. The pay table ROM may also identify a multiplier associated with various poker hands achieved during the bonus game. A bill/ticket validator 45 and coin detector 46 add credits for playing games. A payout device 47 pays out an award to the player in the form of coins or a printed ticket at the end of a game or upon the player cashing out. Player control inputs 48 receive push-button or touch screen inputs for making player selections. An audio board 49 sends signals to the speakers. A display controller 50 receives commands from the processor or network and generates signals for the various displays 51.

Modern gaming machines are connected within a network for remote monitoring of the machines. The game controller board 30 transmits and receives signals to and from a network 56 via a communications board 58. The network 56 includes servers and other devices that monitor the linked gaming machines 10 and GM1-GM-N.

In the below scenario, a software program for playing the base game and bonus game is installed in the gaming machine 10.

The below description of the game refers to steps in the flowchart of FIG. 7 and to certain screen displays shown in FIGS. 3A-3F and 4-6.

Figure 7:
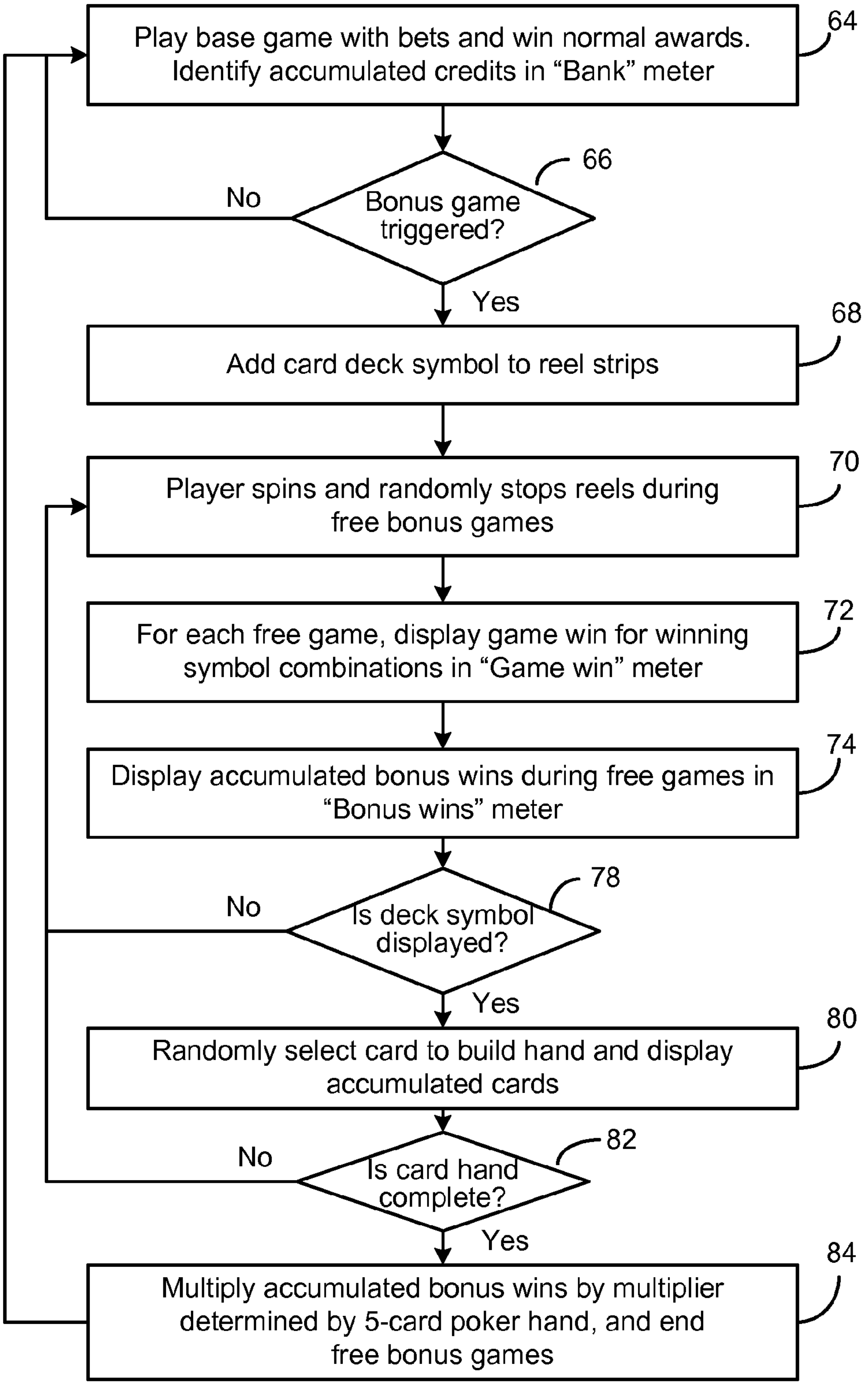
FIG. 7 is a flowchart identifying various steps taken in the carrying out of the bonus game, in accordance with one embodiment of the invention.

In step 64 of FIG. 7, the player of the gaming machine 10 enters a bet amount for playing the base game on the machine 10. In the example, the base game uses five video reels, where a stopped position of each reel displays three vertically aligned symbols. FIG. 1 shows a sample stopped display of the symbols in a 5×3 array. There are many paylines across the array, where the paylines include horizontal paylines (e.g., payline 13) and zig-zag paylines. A player may make a minimum bet of 5 cents to activate one payline (e.g., a center horizontal payline) or may make an increased bet (up to 75 cents) to activate additional paylines, such as all 15 paylines for a maximum bet. Any winning symbol combination on any one of the activated paylines will pay a base award. In another embodiment, all paylines are always activated, and an increased bet increases the awards proportionally.

The credits from a present winning game are identified in a game win meter 26, which may be an area of the display 12. The total credits are shown in a bank meter 24, which may be an area of the display 12.

Figure 3A:
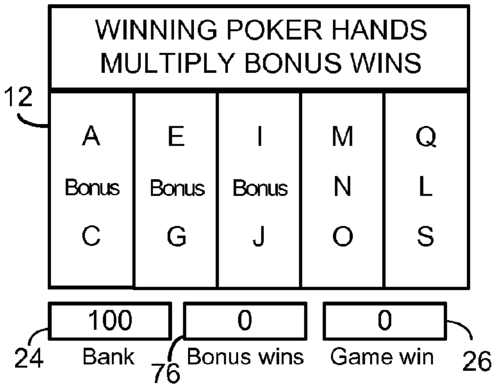
FIGS. 3A-3F illustrate a portion of a video screen displaying reels, awards, and accumulated playing cards over the course of a single bonus round.

In step 66 of FIG. 7, it is determined whether the bonus game is triggered. FIG. 3A illustrates that the bonus game has been triggered by achieving at least three consecutive BONUS symbols from left to right. In one embodiment, the BONUS symbols are scatter symbols so do not have to all appear across a single payline. In another embodiment, the bonus game can be triggered by a mystery trigger, such as a random selection of an eligible player, a random number of games since the last bonus game, or other trigger. If there is a winning symbol combination at the time the bonus game is triggered, the player also wins the instant award. In one embodiment, the occurrence of the three or more BONUS symbols also grants an award of a multiple of the bet, depending on the number of consecutive BONUS symbols (e.g., 5×, 10×, and 50× for 3, 4, and 5 consecutive BONUS symbols, respectively). It is assumed that, immediately prior to the bonus game, the player has 100 credits in the bank meter 24.

In step 68, after the bonus game is triggered, the game processor on board 30 (FIG. 2) adds a special symbol to the middle reel strip only, such as a symbol of a deck of cards. Such a special deck symbol may replace a low value symbol or simply be added to the existing set of symbols. In another embodiment, there are other deck symbols on other reels. The initiation of the bonus game is accompanied by some fanfare and a screen explaining the rules of the bonus game. The bonus game gives the player whatever number of free spins it takes to accumulate seven playing cards, described in detail below. During the free spins, the player also accumulates the normal awards from winning symbol combinations, as the player would in the base game. However, based on the resulting best 5-card poker hand, the amount won during the bonus game is multiplied by a multiplier associated with the particular hand.

In step 70, the player spins and randomly stops the five reels during the free bonus games by pressing a spin-reels button or pulling a handle. In another embodiment, the gaming machine may "auto-play" or automatically spin the reels during the free bonus games.

In step 72, for each free game, winning symbol combinations are detected, and the amount won in a current game is shown in the game win meter 26. All credit meters can be displayed at the bottom of the display 12. The player is motivated to bet a maximum bet during the base game since the same paylines activated during the base game also apply during the bonus game.

Figure 3B:
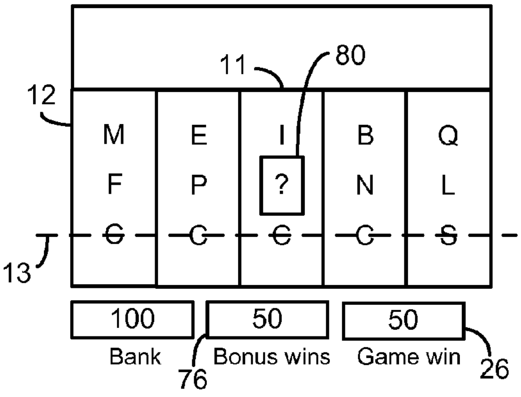

In step 74, the accumulated awards during the free games are displayed on a bonus wins meter 76 (FIG. 3A). FIG. 3B illustrates that the player, on the first free spin, achieved four "C" symbols across the bottom payline 13 and was awarded 50 credits, shown displayed in the game win meter 26 and the bonus wins meter 76. In another embodiment, the player also automatically receives a starting bonus wins amount on meter 76 at the beginning of the free games to ensure that there will at least be a minimum number of credits to multiply at the end of the bonus round.

In step 78, it is determined whether a deck symbol has been displayed anywhere on the screen (the deck symbol is a scatter symbol). FIG. 3B illustrates that the player achieved a deck symbol 80 at the middle position of the third reel. In one embodiment, the deck symbol 80 acts as a wild card for the payline that it is on to create winning symbol combinations.

Figure 3C:
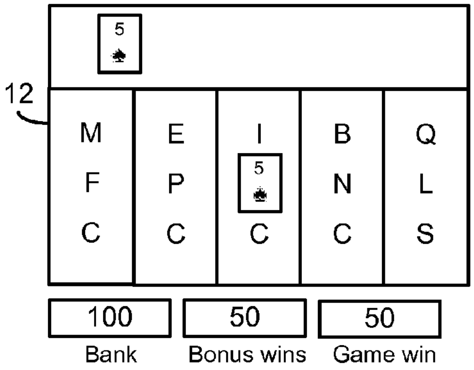

In step 80, after a deck symbol has been detected, the game processor randomly selects a card from the virtual deck. The deck symbol temporarily changes into the selected card, as shown in FIG. 3C, and the card is moved to the top of the display 12, where it will remain throughout the free bonus games. In the example, the selected card is a five of spades.

The deck may consist of a normal 52 card deck or may additionally include wild cards and/or cards that pay instant awards or multiply the present win amount. Such special cards that pay instant awards or act as a multiplier may or may not also represent a rank and suit. However, the free bonus games still end when the player has accumulated seven cards, all having ranks and suits, that the player can use to make the best 5-card poker hand.

In step 82, it is determined whether the player has accumulated seven cards. If not, the player keeps spinning and stopping the reels for the free bonus games, while accumulating bonus awards in the bonus wins meter 76 and accumulating cards.

Figure 3D:
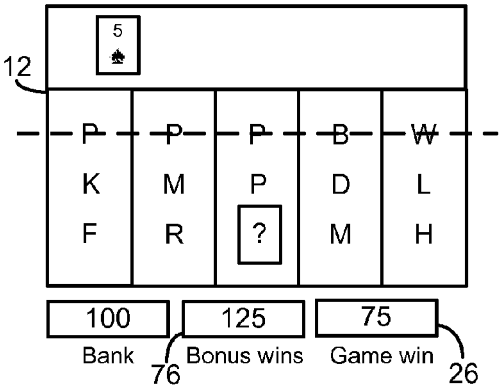
Figure 3E:
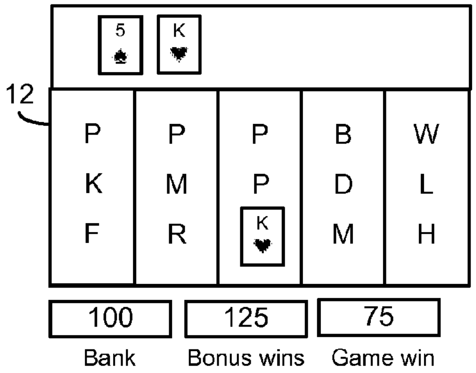
Figure 3F:
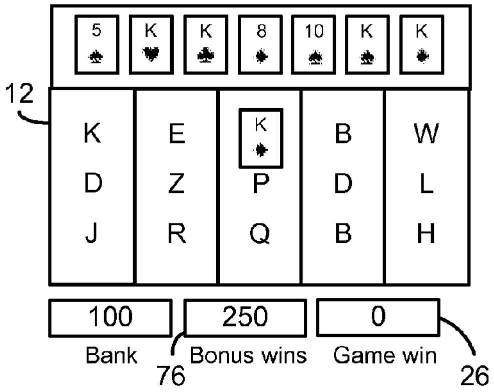

FIG. 3D illustrates a spin where the player achieved another deck symbol and a game win of 75 credits. The meters 26 and 76 are updated, and the card (a King of hearts) is randomly selected and displayed at the top of the display 12 (FIG. 3E). The process continues until seven cards are accumulated at the top of the display, as shown in FIG. 3F, where the final card (a King of diamonds) is shown selected in FIG. 3F.

In step 84, after the seven cards are accumulated, the best 5-card poker hand is determined by a look-up table (e.g., a ROM on the board 30 in FIG. 1), and the hand is associated with a multiplier by the look-up table. The multipliers are shown in FIG. 4, which are displayed to the player either on the top display 14 or bottom display 12 (FIG. 1). Since the player achieved four Kings in FIG. 3F, providing a 10× multiplier, the accumulated bonus wins of 250 credits is multiplied by ten.

FIG. 5 illustrates the display 12 identifying the total win of 2500 credits to the player for the bonus game.

The bonus game then ends, and the normal base game routine begins.

FIG. 6 illustrates how the base game is again shown on display 12 and the bank meter 24 is credited with the 2500 credits from the bonus game. The deck symbol 80 is deleted from the center reel strip for the base games.

In one embodiment, there is an upper limit on the amount the player can win during the bonus game, since there is no limit to the number of free spins before seven cards are accumulated. The upper limit may be determined by statistics, to ensure the machine remains profitable in the long run, or by jurisdictional maximum win regulations. Any win over the upper limit is truncated to the upper limit. The upper limit would normally only be achieved after obtaining a high multiplier.

In another embodiment, to speed up the bonus game, the player is initially dealt two cards at the start of the bonus game.

If the player achieves three or more BONUS trigger symbols during a free game to retrigger the bonus round, that second bonus round will commence immediately after the first bonus round is completed. There may be an upper limit on the number of bonus round re-triggers during the free games.

In another embodiment, the free games end when the player accumulates other than seven cards, such a five cards. In another embodiment, the cards may not conform to the traditional playing cards but may have other symbols, where different combinations of symbols represent different multipliers. A "playing card," as used herein, may represent any symbol or object.

In one variation, in each free game where the deck symbol is displayed after the reels stop, a complete hand of cards is randomly dealt, such as five or seven cards, similar to the display of FIG. 3F. The best 5-card poker hand for that current game is then associated with a multiplier for any win in the current game. In such a variation, the multiplier for each individual free game may be the same as in FIG. 4. The free games end after a certain number of free games, such as ten, or after a certain number of hands of cards are dealt, or upon some other event.

In another variation, a playing card is dealt upon other than receiving a deck symbol (or other special symbol added to the reels during the free games). Such a card-dealing trigger may include a certain symbol combination or other random event. In one embodiment, two or more BONUS symbols being displayed anywhere on the screen causes the player to be dealt a card or a new hand of cards.

In another variation, a poker hand above a certain rank, such as a full house, awards a bonus pot, such as a progressive jackpot, in addition to acting as a multiplier for credits achieved in the free games. A separate meter may identify the bonus pot, which is accumulated from a percentage of all wagers made during the paid games. In the case where a full house, or higher, wins the bonus pot, the player of the game depicted in FIG. 3F would win the bonus pot with four Kings. The bonus pot would then be decremented and transferred to the bank meter 24. The bonus pot would then start again at a low value.

Figure 8:
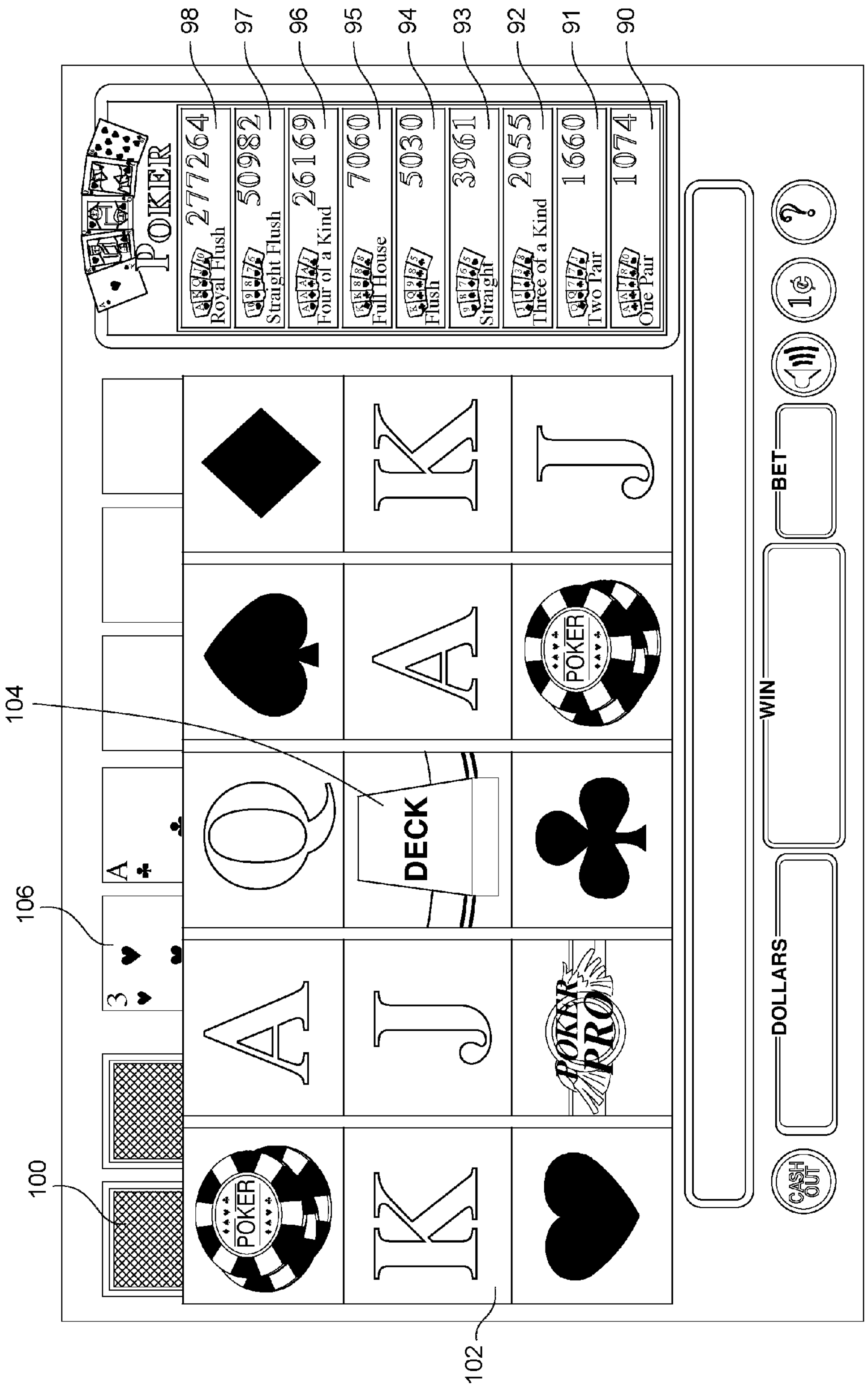
FIG. 8 is a sample display illustrating another embodiment of the invention where there is a separate progressive pot for various types of card hands.

FIG. 8 is a sample display of a gaming machine illustrating another embodiment of the invention, where there is a separate progressive bonus pot for each type of poker hand. FIG. 8 shows separate progressive bonus pots 90-98 for one pair, two pair, three of a kind, straight, flush, full house, four of a kind, straight flush, and royal flush, respectively.

In one embodiment, the gaming machine is in a bank of networked gaming machines. In one embodiment, the various pots 90-98 are incremented based on a percentage of all the wagers bet (i.e., the coins in) for all the machines in the bank. All the machines in the bank use the same progressive pot amounts. The percentages are progressively higher for the more difficult hands to generally make the pots greater for the difficult hands. The relative percentages are generally set based on the odds of obtaining each hand. If any player playing a machine in the bank of machines wins a pot, that pot is awarded to the player, and that pot is reduced to a starting amount for all the machines in the network.

In another embodiment, the pots 90-98 are accumulated based on percentages of winning amounts, or based on certain combinations of symbols occurring, or based a mixture of amounts wagered and game play for all the machines in the bank.

When a pot 90-98 is won, the pot is awarded and drops down to a starting amount, such as zero or a non-zero amount. Each pot 90-98 may have an invisible pot that is used as the starting amount once the visible pot is won. The invisible pots may be accumulated at a smaller percentage than the visible pot, but the percentages will still be relative to the odds of obtaining the hand.

In one embodiment, the player starts with two free, face down cards 100. The cards are displayed at the top of the screen. During the main game, the virtual reels 102 spin.

There is a special symbol 104 on the center reel during the main games. Whenever that symbol 104 is displayed after the reels 102 stop spinning, the player is dealt a random playing card 106 face up. When the player has received five face-up cards, the initial two face-down cards are revealed. The seven cards are then used to make the best possible 5-card poker hand. The player will then be awarded the bonus pot 90-98 that matches the poker hand.

In another embodiment, the special symbol 104 only occurs for a period of time in response to some trigger event.

The accumulation of cards causes the player to want to play the machine at least until a hand is completed.

In another embodiment, the cards are only awarded during free games in a bonus round, where the bonus round is initiated by a special outcome of the main game, such as a special symbol combination or one or more special symbols being displayed. The special symbol 104 is optionally added to the center reel (or any number of reels) during the bonus round. The player is awarded a card and any instant win after each spin (or only if the special symbol 104 is displayed) to accumulate the seven cards.

In another embodiment, as previously described, the player is only dealt a card during a free-game bonus round upon the special symbol 104 being displayed. Once five face-up cards are dealt, the bonus round ends, and any bonus pot is awarded. In such an embodiment, the player is hoping that no special symbol 104 occurs in the bonus round so the player gets more free spins and instant wins.

By providing progressive bonus pots 90-98, the players are motivated to keep playing the networked gaming machines in order to win a large pot before another player wins the pot. In some cases, one or more of the pots 90-98 will become unusually high, and it will be mathematically advantageous for the players to keep playing in order to win the unusually high pot.

In another embodiment, the display of FIG. 8 is for a stand-alone machine, and the pots are accumulated based on the coins-in of that machine alone.

Combinations of all the various games described herein are also envisioned.

Although a dedicated gaming machine has been described, the term "gaming machine" may also apply to a programmed home computer programmed to carry out the present bonus game.

The term "random" used herein refers to pure random as well as pseudo-random.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a video gaming device, the method comprising:

spinning and stopping virtual reels, having symbols, to generate an array of symbols;

granting awards to a player for winning symbol combinations after a reel spin;

dealing virtual playing cards in response to stopped reels;

accumulating dealt cards from a plurality of reel spins until a full set of cards is accumulated, while granting awards to the player for winning symbol combinations after each reel spin;

generating a plurality of progressive pots, where the pots do not have predetermined set amounts, each pot being uniquely associated with a particular poker hand achievable with the full set of cards;

after the full set of cards is accumulated, determining the player's poker hand; and awarding the player the progressive pot associated with the poker hand while also granting awards to the player for winning symbol combinations.

2. The method of claim 1 wherein the step of dealing virtual playing cards is triggered by a special symbol being displayed after the reels have stopped spinning.

3. The method of claim 1 wherein the step of dealing virtual playing cards occurs during a base game performed by the gaming machine.

4. The method of claim 1 further comprising dealing two virtual cards face down, wherein the step of dealing virtual playing cards comprises dealing five more cards face up, wherein the full set of cards is seven cards, and wherein the player's poker hand is the best five-card hand made from the seven cards.

5. The method of claim 1 wherein generating the plurality of progressive pots comprises accumulating each pot based on a percentage of wagers made by at least the player playing the video gaming device.

6. The method of claim 5 wherein a percentage associate with a pot is generally based on the odds of the hand occurring associated with that pot.

7. The method of claim 1 wherein generating a plurality of progressive pots comprises accumulating each pot based on outcomes of stopped reels.

8. The method of claim 1 wherein the video gaming device is connected in a network of other video gaming devices, wherein all the video gaming devices in the network use the same progressive pots, and wherein generating the plurality of progressive pots comprises accumulating each pot based on a percentage of wagers made by all players playing the video gaming devices in the network.

9. The method of claim 1 wherein the cards are only dealt to the player during bonus games in a bonus round.

10. A gaming machine comprising:

a display screen: and a processing system programmed to carry out the following method:

spinning and stopping virtual reels, displayed on the display screen, to generate an array of symbols;

granting awards to a player for winning symbol combinations after a reel spin;

dealing virtual playing cards in response to stopped reels;

accumulating dealt cards from a plurality of reel spins until a full set of cards is accumulated, while granting awards to the player for winning symbol combinations after each reel spin;

generating a plurality of progressive pots, where the pots do not have predetermined set amounts, each pot being uniquely associated with a particular poker hand achievable with the full set of cards;

after the full set of cards is accumulated, determining the player's poker hand;

awarding the player the progressive pot associated with the poker hand while also granting awards to the player for winning symbol combinations.

11. The machine of claim 10 wherein the step of dealing virtual playing cards is triggered by a special symbol being displayed after the reels have stopped spinning.

12. The machine of claim 10 wherein the step of dealing virtual playing cards occurs during a base game performed by the gaming machine.

13. The machine of claim 10 further comprising the processing system being programmed to carry out the following step: dealing two virtual cards face down, wherein the step of dealing virtual playing cards comprises dealing five more cards face up, wherein the full set of cards is seven cards, and wherein the player's poker hand is the best five-card hand made from the seven cards.

14. The method of claim 1 wherein the video gaming device comprises a programmed computer that carries out the method using a processor.

15. The machine of claim 10 wherein the gaming machine comprises a programmed computer that carries out the method using a processor.

* * * * *